March 10, 1942.     G. E. FORD     2,276,179
THERMOMETER AND SUPPORT THEREFOR
Filed Dec. 18, 1939
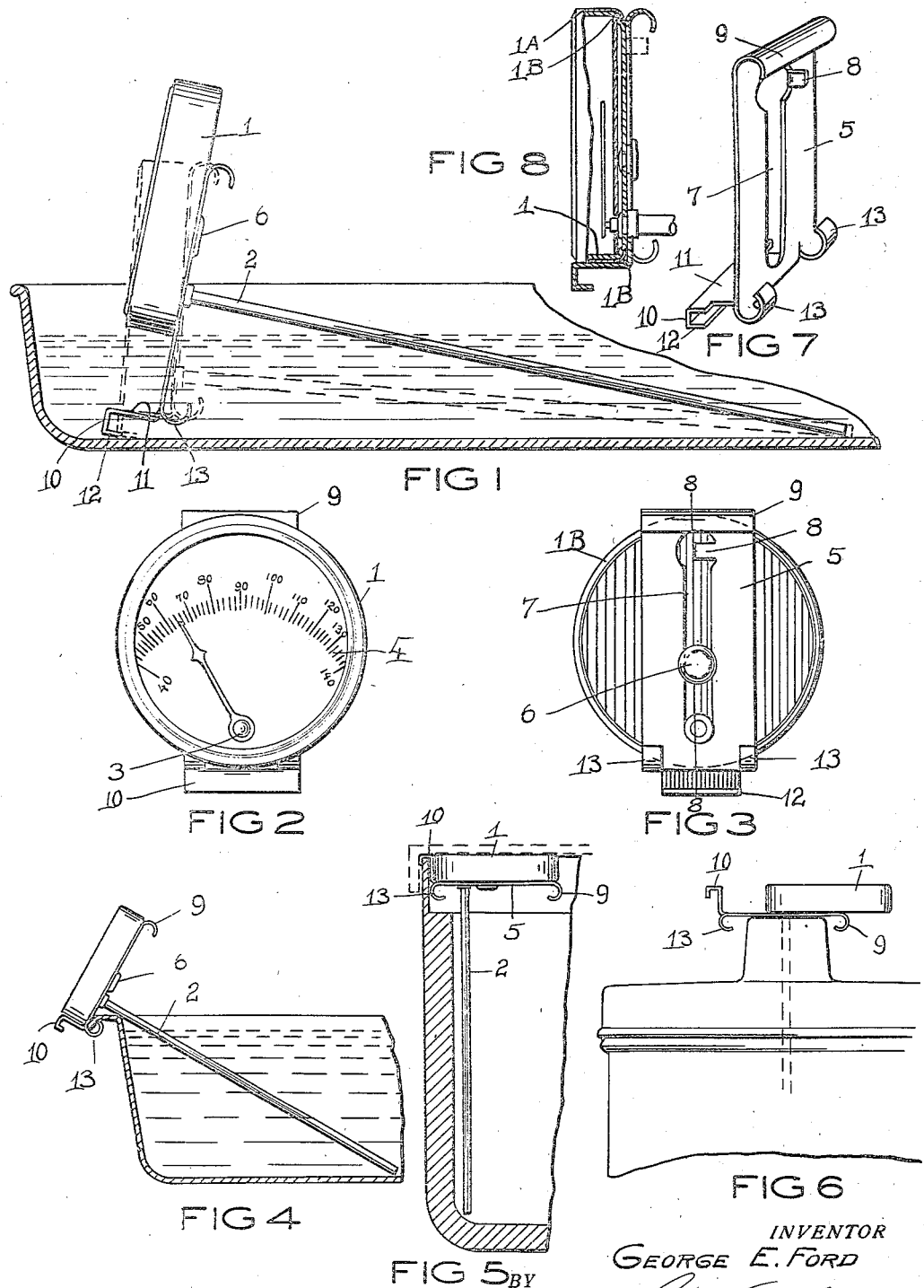
INVENTOR
GEORGE E. FORD
BY
ATTORNEY Patented Mar. 10, 1942

2,276,179

UNITED STATES PATENT OFFICE 2,276,179

THERMOMETER AND SUPPORT THEREFOR

George E. Ford, Rochester, N. Y., assignor to Rochester Manufacturing Co. Incorporated, Rochester, N. Y., a corporation of New York Application December 18, 1939, Serial No. 309,781

10 Claims. (Cl. 73—343)

This invention relates to thermometers especially adapted for use by both professional and amateur photographers in preparing developing and fixing solutions, and the invention has for its principal object to provide a bi-metallic thermometer having a sealed, moisture proof dial case with a thermometer tube which is arranged in a position relative to the edge of the dial case and the support provided thereon, so as to permit the adjustable placement of the thermometer in a flat pan to have the portion of the thermometer tube containing the thermo-responsive element held immersed in either a small or large quantity of solution in the pan and the dial case held above the liquid level for a conveniently readable and accurate indication on the dial.

A further object of this invention is to provide a thermometer of this type with an adjustable supporting bracket with which the thermometer is adapted to be temporarily or permanently held supported in positions either entirely within or on the wall of pans, tanks etc. for constant readable indication of the liquid temperature.

Another object of this invention is to provide a thermometer of this type with a supporting bracket with which it may be held suspended on the edge within a tank without interfering with the placement or removal of the cover of the tank.

Still another object of this invention is to provide a thermometer having a dial case with a supporting bracket that may be attached to the back of the dial case after the edge of the bezel has been folded and sealed thereover.

All these and other objects and attendant advantages of this invention will become more readily apparent from the detailed description thereof which follows, reference being had to the accompanying drawing in which—

Figure 1 is a side elevation of the thermometer embodying my invention as it appears when placed on the flat bottom of a shallow pan.

Figure 2 is a front elevation of the thermometer.

Figure 3 is a rear elevation thereof.

Figure 4 is a side elevation of the thermometer as it appears supported on the ledge of a deep pan.

Figure 5 is a side elevation of the thermometer as it appears suspended from the edge of a tank on the inside wall thereof.

Figure 6 illustrates the thermometer as it appears mounted on a spool type developing tank for roll films.

Figure 7 is a detail perspective view of the supporting bracket of the thermometer.

Figure 8 is a partial vertical section of the dial case of the thermometer taken on the line 8—8 of Figure 3.

The thermometer and its supporting bracket, forming the subject matter of my present invention, is especially adapted for use by photographers to keep their developing and fixing solutions at the proper temperature. Various types of pans or tanks are used for these solutions depending on the quantity of solution needed at one time or whether the solution is temporarily or permanently placed in the container, and the construction of the thermometer and its support is such that it may be conveniently placed on the bottom of a pan for an accurate and quick reading of the indicated temperature of either large or small quantities of the solution in a shallow pan, or be attached to the wall of various forms of deep pans and tanks now used by photographers, so as to permit a quick, accurate and easy reading of the temperature indication on the thermometer dial at the top of the wall.

The thermometer comprises the cylindrical dial case 1 with the thermometer tube or stem 2 extending from the back near the edge thereof. This locates the pivotal point of the pointer 3 eccentrically on the dial 4 and provides a maximum range of movement for the indicating end of the pointer with a minimum thermal action on the thermo-responsive element of the thermometer for accurate indications thereby. Both the dial casing and the thermometer tube are hermetically sealed to keep moisture from entering and interfering with the operation of the thermometer. The dial casing is sealed by the bezel 1A which, for this purpose, encircles the entire body of the casing and has its rear edge folded over the edge of the back of the casing as indicated at 1B. For this reason the supporting bracket is made attachable to the back of the casing after the casing is completely assembled as will hereinafter appear.

The thermometer support comprises a bracket 5 which is adapted to cooperate with the thermometer tube to make the thermometer self supporting in angular adjustable positions within a shallow pan or provide means whereby the thermometer may be adjustably attached to the wall of a deeper pan or tank. The bracket is mounted at the back of the dial case which, for this purpose, is provided with an anchoring stud 6. The bracket is made up in the form of a slightly bowed sheet metal backing plate with a substantially key hole shaped guide slot 7 extending longitudinally in the middle of the bracket between the top and bottom thereof. The enlarged head at the top of the anchoring stud 6 is adapted to enter the enlarged end of the slot 7 so that the stud may slide into the slot proper with the head overhanging the edges thereof. In this way the head will not only hold the bracket movable on the back of the dial case, but, due to the curvature of the backing plate of the bracket, will yieldingly force the backing plate against the back of the dial case at any point of its engagement with the edges of the guide slot.

A lug 8 is provided so as to extend into the upper end of the guide slot as illustrated in Figures 3 and 7. This lug is at first bent outwardly to permit the insertion of the head of the anchoring stud for the attachment of the bracket to the dial case, but after the anchoring stud is located in the narrow portion of the slot, the lug is bent back into the enlarged portion of the slot so as to provide a stop that will keep the anchoring stud from re-entering the enlarged end of the slot and prevent its disengagement therefrom. It is this feature which provides for the attaching and locking of the bracket to the casing after the casing is completely assembled and the bezel is pressed in place or folded over the back thereof.

The backing plate is curved outwardly at the top to form a handle member 9 so that the bracket may be adjusted thereby by moving the bracket on the dial case or holding the bracket and moving the dial case relative thereto.

The bottom of the backing plate is bent forwardly of the bracket for a distance equaling the depth of the dial case and is then bent down and back into a horizontally extending substantially hook shaped base member 10 for the support of the bracket. The shoulder 11, formed by this base member, is adapted to have the dial case rest thereagainst in its lower-most position on the supporting bracket while the ledge 12 thereof serves as the base proper.

As illustrated in Figure 3, the thermometer tube 2 projects thru the guide slot at a point diametrically spaced from the anchoring stud 6 so that the engagement of these two members into the slot holds the bracket in a predetermined position on the dial case and guides the bracket in a straight line movement on the back thereof.

A pair of hook shaped ears 13, 13, one on each side of the shoulder 11 of the base member, are formed to project rearwardly of the bracket to provide means whereby the bracket may be supported on and locked to the upper edge of a pan or tank as will hereinafter appear.

When the thermometer is to be used in a shallow pan it is placed entirely within it as illustrated in Figure 1 and the dial case is adjusted on the bracket so that it will be located above the liquid level of the solution within the pan. If but a small quantity of liquid is in the pan the dial case is adjusted against the shoulder 11 with the base 10 and the end of the thermometer tube 2 resting on the bottom of the pan as illustrated in dotted lines in Figure 1, whereas if a large amount of solution is in the pan the dial case is raised on the bracket to have it and the end of the thermometer tube support the dial case in the full line position illustrated in Figure 1. The dial case is thus in each case supported above the liquid level in an angular position in which the dial of the thermometer may be conveniently observed while the outer end of the thermometer tube which contains the thermo-responsive element is held submerged in the solution.

When the pan is filled so that the dial case of the thermometer would be wholly or partially submerged in the solution if placed within it, as illustrated in Figure 1, the thermometer is angularly supported on the edge of the pan as illustrated in Figure 4. In this position the hooked shaped ears 13, 13 are forced over the flanged edge of the pan to have these ears tightly grip the flange and lock the dial case and bracket to the edge of the pan with the thermometer tube extending angularly toward the bottom of the pan on the inside thereof.

In deep tanks and tanks in which the thermometer is more or less permanently mounted, the hook shaped base member 10 is hooked over the edge of the tank as illustrated in Figure 5. The dial case in this instance is placed close to the shoulder 11 of the bracket so that the thermometer tube extends into the tank parallel to the wall in close proximity thereto in order to occupy a minimum space in the tank. The dial case, when suspended in this manner, has its top substantially level with the top edge within the tank so that a cover may be placed on the tank without interfering with the thermometer and its mounting.

When used in connection with a so-called spool type developing tank the thermometer tube is inserted thru a small hole in the center of the cover of the tank so that the back of the bracket supports the dial casing on the cover as illustrated in Figure 6.

I claim:

1. A thermometer comprising a dial case, a thermometer tube projecting from the back of said dial case, an anchoring stud projecting from the back of said dial case at a point diametrically in line with the point of projection of said thermometer tube, and a longitudinally bowed sheet metal supporting bracket having a slot extending longitudinally thereof carried on the back of said dial case with said anchoring stud and said thermometer tube projecting therethru, and a head on said anchoring stud adapted to draw the bowed portion on said bracket against the back of said dial case to yieldingly hold said bracket in adjustable positions on the back of said dial case relative to said thermometer tube.

2. In a supporting bracket for thermometers having a dial case and a thermometer tube extending rearwardly of said dial case, the combination of a backing plate having a guide slot extending longitudinally thereof, a shoulder extending transversely at one end of said backing plate to provide a supporting base for said backing plate, and anchoring means movable in said guide slot in engagement with said dial case for holding said dial case against said backing plate with said thermometer tube spaced from said anchoring means and projecting thru and movable in said guide slot.

3. In a thermometer, a dial case, a thermometer tube extending rearwardly of said dial case, a supporting plate movable on the back of said dial case having a guide slot extending longitudinally thereof, handle means at one end of said supporting plate, a base at the other end of said supporting plate, and anchoring stud carried by said case and movable in said guide slot for holding said dial case against said supporting plate, said thermometer tube being spacedly arranged relative to said anchoring stud and projecting thru said guide slot to align said guide slot with said stud and thermometer tube and cause said supporting plate to be guided in a straight line movement on said dial case relative to said thermometer tube.

4. A thermometer comprising a dial case, a thermometer tube projecting rearwardly from the back of said dial case, a supporting bracket on the back of said dial case having a slot therethrough extending longitudinally thereof, a connecting stud on the back of said housing engaging said slot for slidably fastening said bracket to said dial case, said thermometer tube extending through said slot and coacting with said connecting stud to provide a straight line movement of said supporting bracket on said dial case transversely to said thermometer tube.

5. A thermometer comprising a dial case, a thermometer tube extending from the back of said dial case, a bracket movable on the back of said dial case, a stud on the back of said case, means embodied in said bracket for engagement by said stud for slidably fastening said bracket to said dial case, and supporting means on said bracket for movement therewith toward and away from the rim of said dial case and cooperating with the outer end of said thermometer tube to selectively support said case in elevated positions on said bracket.

6. A thermometer as set forth in claim 5 in which said bracket is offset at the bottom toward the front of said dial case to provide a base under the rim of said dial case.

7. A thermometer as set forth in claim 5 with a pair of hook shaped supporting members on said bracket extending rearwardly of said dial case, one on each side of said thermometer tube.

8. In combination with a thermometer having a dial case and a thermometer tube extending rearwardly of said dial case, of a bracket mounted to slide in frictional engagement with said dial case and transversely of said thermometer tube, and supporting means on said bracket for cooperation with said thermometer tube in the support of the thermometer in a selected adjustable position.

9. In combination with a thermometer having a cylindrical dial case and a thermometer tube extending rearwardly of said dial case, of a bracket mounted to slide in a straight line movement in frictional engagement with said dial case, supporting means on said bracket extending transversely thereof for movement relative to the thermometer tube toward and away therefrom.

10. A thermometer comprising a dial case, a thermometer tube projecting rearwardly from the back of said dial case, a supporting bracket on the back of said dial case having an elongated slot longitudinally thereof with an enlargement of the slot at one end thereof, an anchoring stud carried by said dial case for engagement into the enlargement of said slot and movement in said slot to slidably connect said bracket with said dial case, a bendable lug carried by said bracket for movement into the enlargement of said slot to provide stop means for said anchoring stud in the enlarged portion of said slot and prevent disengagement of said anchoring stud thru the enlarged portion of said slot, said thermometer tube projecting thru said slot in said supporting bracket and coacting with said anchoring stud to provide a straight line movement of said supporting bracket on said dial case transversely to said thermometer tube.

GEORGE E. FORD.